3,391,105
PRODUCTION OF CARBON BLACK
Yuan C. Fu, Los Angeles, Calif., assignor to Phillips
Petroleum Company, a corporation of Delaware
No Drawing. Filed Nov. 30, 1964, Ser. No. 414,840
6 Claims. (Cl. 260—41.5)

ABSTRACT OF THE DISCLOSURE

The pH is lowered and the volatile content of carbon black is increased by treating carbon black with thiourea. Rubber products which are reinforced with carbon black which has been so treated have improved modulus and tensile strength.

---

This invention relates to the production of carbon black. In one aspect this invention relates to a novel process of treating oil furnace carbon blacks to improve their activity as reinforcing agents in the manufacture of rubber. In still another aspect this invention relates to rubber vulcanizates having controlled properties of modulus and tensile strength. In yet another aspect this invention relates to the treatment of carbon black to reduce the pH value and increase the volatile material content of the carbon black while at the same time increasing the modulus and tensile strength properties of rubber vulcanizates in which the carbon black is utilized as a reinforcing agent.

Carbon black is produced in large quantities from liquid hydrocarbon feed stocks in carbon black producing furnaces. Prior to the advent of the furnace carbon blacks the major portion of the carbon black was produced by the channel process. The greater portion of the carbon black produced today is used as a reinforcing agent for rubber. By far the greater portion of the compound rubber containing carbon black is designed specifically for tire treads or tire carcasses. This rubber compounding art has advanced to a state such that the quality of the carbon black used in the compounding must be controlled within narrow limits. Control of all of the desired properties of the carbon black is oftentimes difficult to achieve.

It is oftentimes desirable to produce a rubber vulcanizate having high values of modulus and tensile strength and this is often difficult to achieve because the value of modulus usually increases with increased cure time whereas the tensile strength is often reduced with increased curing time.

I have discovered that oil furnace carbon blacks can be treated with thiourea with the result that the surface chemistry of the carbon black is modified substantially as reflected by a decrease in the pH value and an increase in the volatile content of the carbon black. I have discovered that the complexes formed on the surface of the carbon black that provide these modified characteristics of the carbon black are quite stable and the carbon black so treated has the property of increasing the modulus and tensile strength of rubber vulcanizates containing such carbon black. Although I do not wish to be bound by the theory of the modification of the carbon black, it is believed that the treatment of carbon black with thiourea forms nitrogen and sulfur complexes on the surface of the carbon black. Upon devolatilization, the treated black evolves principally hydrogen cyanide and nitrogen in addition to the usual carbon oxides. Minor amounts of sulfur, dioxide, cyanogen, carbonyl sulfide and carbon disulfide are also evolved. Treatment of the carbon black with thiourea and a strong oxidizing medium such as nitric acid results in a further lowering of the pH and a further increase in volatile content of the carbon black.

It is an object of this invention to provide a method for treating furnace carbon blacks to lower the pH and to increase the volatile content of the carbon black. It is also an object of this invention to provide a reinforcing carbon black for producing rubber vulcanizates having increased values of modulus and tensile strength. A further object of the invention is the provision of a rubber formulation that will produce rubber vulcanizates having higher than normal values of modulus and tensile strength at shorter than normal curing time periods. The carbon black of the invention is produced by wetting the carbon black with a solution of thiourea or thiourea and nitric acid; drying the thoroughly wetted carbon black and then heating the carbon black in a relatively stagnant atmosphere for about 0.5 to 10 hours at a temperature in the range of 150 to 450° C. The carbon black is advantageously wetted with about 100 parts by weight of water per 100 parts by weight of carbon black and the water will contain the equivalent of 0.1 to 10 weight percent thiourea with or without 0.1 to 10 weight percent of nitric acid. I prefer to treat the furnace carbon blacks of commerce with about 0.3 to 7.5 percent of thiourea or a mixture of about 0.3 to 7.5 percent thiourea and 0.3 to 7.5 percent nitric acid at a temperature between about 200 and 400° C. for about 1 to 5 hours in a stagnant air atmosphere because this provides a satisfactory treatment for substantially all uses at a minimum of time and expense. When equal parts by weight of water and carbon black are utilized in the step of wetting the carbon black, the percentage of thiourea or mixture of thiourea and nitric acid in the water will represent the amount of thiourea or thiourea and nitric acid reacted with the carbon black.

The following examples will be helpful in attaining an understanding of this invention but the examples are intended to be merely illustrative of the invention and should not be construed as unduly limiting the invention.

Example 1

Samples of an Intermediate Super Abrasion Furnace Carbon Black (ISAF) were wetted with 100 parts by weight of water (containing the indicated amounts of treating agents) per 100 parts by weight of carbon black; dried; and heated in an oven in a stagnant air atmosphere for the indicated time at a temperature of 220° C. The properties of the treated carbon black samples are shown in the following Table I:

TABLE I.—EFFECT OF THIOUREA WITH AND WITHOUT NITRIC ACID ON CARBON BLACK

| Run Number | Treating Agent, wt. percent | | Heating Time, hrs. | pH [1] | Volatiles, percent [2] |
|---|---|---|---|---|---|
| | Thiourea | Nitric Acid | | | |
| 1 | 0 | 0 | 0 | 7.9 | 2.40 |
| 2 | 0 | 0 | 3 | 6.2 | 1.85 |
| 3 | 0.5 | 0 | 3 | 4.7 | 2.00 |
| 4 | 1.0 | 0 | 3 | 3.5 | 2.20 |
| 5 | 1.0 | 0.9 | 2.5 | 2.8 | 2.29 |
| 6 | 2.0 | 0 | 3 | 3.7 | 3.01 |
| 7 | 2.0 | 1.6 | 2.5 | 2.1 | 3.44 |
| 8 | 4.0 | 0 | 3 | 3.2 | 3.86 |
| 9 | 4.0 | 3.3 | 2.5 | 1.9 | 5.78 |

[1] ASTM D-1512-60.
[2] Percentage weight loss of dried sample of carbon black sample after 7 minutes at 950° C. in absence of air.

The data in the above Table I shows that treatment of the carbon black with thiourea lowers the pH and increases the volatile content of the carbon black and that increasing the amounts of thiourea further lowers the pH and further increases the volatile content of the carbon black. It should also be noted that the additional treatment with nitric acid increases this effect. It is surprising that treatment of carbon black with thiourea reduces the pH of the carbon black because thiourea is neither acidic nor is thiourea considered to be an axidizing agent.

Example II

Samples of carbon black treated as in Example I were incorporated in styrene-butadiene synthetic rubber, cured and tested. Modulus and tensile strength properties of the resulting rubber samples are shown in the following Table II:

TABLE II.—CARBON BLACK PROPERTIES IN SBR RUBBER

| Run Number | Treating Agent, wt. percent | | Heating Time, hrs. at 220° C. | pH | Volatiles, percent | Cure 30 Minutes at 307° F. | | | |
|---|---|---|---|---|---|---|---|---|---|
| | Thiourea | Nitric Acid | | | | 300% Modulus, p.s.i.[1] | | Tensile, Strength, p.s.i.[1] | |
| SBR 1 | 0 | 0 | 0 | 7.9 | 2.40 | --- | 1,525 | --- | 4,130 |
| SBR 2 | 0 | 0 | 3 | 6.2 | 1.85 | [2] 540 | 1,540 | [3] 1,780 | 4,000 |
| SBR 3 | 0.5 | 0 | 3 | 4.7 | 2.00 | [2] 740 | 1,590 | [3] 2,100 | 4,190 |
| SBR 4 | 1.0 | 0.9 | 2.5 | 2.8 | 2.29 | --- | 1,780 | --- | 3,410 |

[1] ASTM-D-412-61T. Instron Tensile Machine. Tests made at 80° F.
[2] Modulus at 15 minute cure.
[3] Tensile at 15 minute cure.

SBR Rubber Recipe

| | Parts by weight |
|---|---|
| Styrene-butadiene rubber | 100 |
| Carbon black | 50 |
| Zinc oxide | 3 |
| Stearic acid | 1 |
| Sulfur | 1.75 |
| Extender oil | 10 |
| N-cyclohexyl-2-benzothiozolesulfenamide | [1] 1.3 |
| Flexamine (a) [2] | 1 |

[1] 1.2 in SBR 1.
[2] A physical mixture of a complex diarylaminoketone reaction product (65%) and N,N'-diphenyl-p-phenylenediamine (35%).

The data of Table II show that the treatment of carbon black with thiourea increases the modulus and tensile strength of the rubber in which the carbon black is incorporated as reinforcing agent. These data also indicate that treatment of the carbon black with nitric acid along with the thiourea treatment further increases the modulus property of the rubber. It should be noted that the treatment of carbon black with thiourea provides a modest increase in the modulus of the rubber at 15 minute cure but provides a great increase in the tensile strength of the rubber at 15 minute cure. Thus treatment of the carbon black with thiourea provides a method for achieving outstanding tensile strength in a rubber vulcanizate at short cure time periods.

Example III

Samples of the carbon black treated as in Example I were incorporated in natural rubber and evaluated as in Example II. The results of this evaluation are shown in Table III:

TABLE III.—CARBON BLACK PROPERTIES IN NATURAL RUBBER

| Run No. | Treating Agent, wt. Percent Thiourea | Heating Time, hrs. at 220° C. | pH | Volatiles, Percent | Cure 30 Minutes at 307° F. | |
|---|---|---|---|---|---|---|
| | | | | | 300% Modulus, p.s.i. | Tensile Strength, p.s.i. |
| NR 1 | 0 | 3 | 6.2 | 1.85 | 2,230 | 4,070 |
| NR 2 | 0.5 | 3 | 4.7 | 2.00 | 2,290 | 4,110 |
| NR 3 | 1 | 3 | 3.5 | 2.20 | 2,350 | 4,350 |

Natural Rubber Recipe

| | Parts by weight |
|---|---|
| Natural rubber | 100 |
| Carbon black | 50 |
| Zinc oxide | 5 |
| Stearic acid | 3 |
| Sulfur | 2.5 |
| 2,2'-dibenzothiazyl disulfied | 0.6 |

The treatment of carbon black with thiourea increases both the modulus and the tensile strength of rubber in which the treated carbon black is incorporated as shown by the data in the above Table III.

Treatment of carbon black with thiourea or with thiourea and nitric acid in a fluidized bed of carbon black was not satisfactory because the properties of the carbon black were not greatly changed and the properties of rubber in which the carbon black was incorporated were not greatly changed. It is preferred therefore that the treating atmosphere be rather stagnant during treatment, presumably to minimize loss of the treating agent. An externally heated, closed rotary kiln, into which the carbon black and treating agents are introduced and from which the treated carbon black can be withdrawn, is a preferred means for treating the carbon black. A heated oven without air circulation having removable trays can also be utilized. Any means for heating the carbon black and the treating agent to the desired temperature in a stagnant air atmosphere can be utilized to produce the carbon black of this invention.

The treatment of the carbon black does not require any special curing techniques in producing rubber vulcanizates. Conventional curing agents known to the art and useful for producing rubber vulcanizates can be employed in rubber recipes wherein the carbon black of this invention is utilized.

The carbon black of this invention can be utilized in any rubber wherein carbon black is useful as a reinforcing agent. Examples of such rubbers include natural rubber, emulsion polymerized polybutadiene and butadiene-styrene rubber, solution polymerized polybutadiene and butadiene-styrene rubber, thiokol rubber, and the like and blends thereof.

That which is claimed is:

1. In the process of making carbon black reinforced rubber products wherein a rubber mix containing rubber, curing agents and the reinforcing carbon black is preformed and vulcanized, the improvement comprising treating said reinforcing carbon black with sufficient thiourea and heating to increase the modulus and tensile strength of the finished rubber prior to incorporating the carbon black in the rubber mix said carbon black being treated with from about 0.1 to 10 weight percent of thiourea.

2. In a process for making carbon black reinforced rubber products wherein a rubber mix containing rubber, curing agents and the reinforcing carbon black is preformed and vulcanized, the improvement comprising treating said reinforcing carbon black with from about 0.1 to 10 weight percent of thiourea at a temperature of about 150 to 450° C. for a time in the range of about 0.5 to 10 hours in a substantially stagnant air atmosphere.

3. The process of claim 2 wherein the thiourea is added to an amount of water about equal to that of the carbon black; the carbon black is wetted with the water containing the thiourea; the carbon black is dried; and the dried carbon black is then heated.

4. In a process of making carbon black reinforced rubber products wherein a rubber mix containing rubber, curing agents and the reinforcing carbon black is preformed and vulcanized, the improvement comprising treating said reinforcing carbon black with about 0.1 to 10 weight percent of thiourea and about 0.1 to 10 weight percent of nitric acid at a temperature of about 150° to 450° C. for a period of time in the range of about 0.5 to 10 hours in a substantially stagnant air atmosphere.

5. A carbon black reinforced rubber product wherein said carbon black has been treated with from about 0.1 to 10 weight percent thiourea at a temperature of about 150 to 450° C. for a time in the range of about 0.5 to 10 hours in a substantially stagnant air atmosphere.

6. A carbon black reinforced rubber product wherein said carbon black has been treated with from about 0.1 to 10 weight percent thiourea and from about 0.1 to 10 weight percent nitric acid at a temperature of about 150 to 450° C. for a time in the range of about 0.5 to 10 hours in a substantially stagnant air atmosphere.

References Cited

UNITED STATES PATENTS

| | | | |
|---|---|---|---|
| 3,244,484 | 5/1966 | Johnson | 106—307 |
| 3,023,118 | 2/1962 | Donnet | 106—307 |
| 3,248,252 | 5/1966 | Schirmer | 106—307 |
| 3,266,244 | 12/1965 | Jordan | 106—307 |
| 3,301,694 | 1/1967 | Kraus | 106—307 |
| 2,958,680 | 11/1960 | Brooks | 260—41.5 |
| 2,535,869 | 12/1950 | Schneider | 260—41.5 |

JULIUS FROME, *Primary Examiner.*